(12) United States Patent
Thienel

(10) Patent No.: US 9,194,343 B2
(45) Date of Patent: Nov. 24, 2015

(54) WATER SEPARATOR, IN PARTICULAR FOR FUEL SUPPLY SYSTEMS OF INTERNAL COMBUSTION ENGINES IN MOTOR VEHICLES

(75) Inventor: Michael Thienel, Thurnau (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 803 days.

(21) Appl. No.: 13/202,188

(22) PCT Filed: Jan. 20, 2010

(86) PCT No.: PCT/EP2010/050625
§ 371 (c)(1),
(2), (4) Date: Oct. 13, 2011

(87) PCT Pub. No.: WO2010/094529
PCT Pub. Date: Aug. 26, 2010

(65) Prior Publication Data
US 2012/0043267 A1   Feb. 23, 2012

(30) Foreign Application Priority Data

Feb. 18, 2009   (DE) .................... 20 2009 002 303 U

(51) Int. Cl.
*B01D 17/04* (2006.01)
*F02M 37/22* (2006.01)

(52) U.S. Cl.
CPC ............ *F02M 37/221* (2013.01); *B01D 17/045* (2013.01)

(58) Field of Classification Search
None
See application file for complete search history.

(56) References Cited

U.S. PATENT DOCUMENTS

| 4,740,299 | A | 4/1988 | Popoff et al. | |
| 8,017,009 | B2* | 9/2011 | Arteche et al. | 210/323.1 |
| 2006/0219622 | A1 | 10/2006 | Arteche et al. | |
| 2010/0206800 | A1* | 8/2010 | Veit et al. | 210/416.4 |
| 2012/0043267 | A1* | 2/2012 | Thienel | 210/172.1 |

FOREIGN PATENT DOCUMENTS

| DE | 10333185 A1 | 2/2005 |
| DE | 102006005108 A1 | 8/2007 |
| DE | 202007007120 U1 | 10/2008 |
| EP | 1256707 A2 | 11/2002 |
| WO | 2008037561 A1 | 4/2008 |

OTHER PUBLICATIONS

International search report of PCT/EP2010/050625.

* cited by examiner

*Primary Examiner* — Robert Popovics
(74) *Attorney, Agent, or Firm* — James Hasselbeck

(57) ABSTRACT

The invention relates to a water separator (1), in particular for fuel supply systems of internal combustion engines in motor vehicles, comprising a housing (2) having a separation chamber (11) designed therein and a separation element (18). A collection chamber (12) for the water separated out of the fuel is arranged under the separation chamber. An inlet (8) and an outlet (14) for the fuel are furthermore provided on the housing (2). The housing (2) is substantially designed as a tube-shaped element (3) having a horizontal longitudinal axis (LA), wherein a partition (10) extends in the direction of the longitudinal axis (LA), separating the separating chamber (11) from the collection chamber (12). The separating element (18) comprises a tube element (19) lying horizontally in the separation chamber (11) having radial openings (21) through which the fuel is conducted, wherein the tube element (19) extends at least approximately parallel to the partition (10).

21 Claims, 2 Drawing Sheets

WATER SEPARATOR, IN PARTICULAR FOR FUEL SUPPLY SYSTEMS OF INTERNAL COMBUSTION ENGINES IN MOTOR VEHICLES

CROSS REFERENCE TO RELATED APPLICATIONS

This application is US National Stage Entry of international patent application no. PCT/EP2010/050625, filed Jan. 20, 2010 designating the United States of America, the entire disclosure of which is incorporated herein by reference. Priority is claimed based on Federal Republic of Germany patent application no. 20 2009 002 303.6, filed Feb. 18, 2009.

TECHNICAL FIELD

The invention concerns a water separator, in particular for fuel supply systems of internal combustion engines in motor vehicles.

PRIOR ART

Devices for separating water from the fuel in fuel supply systems are often combined with a fuel filter. For example, U.S. Pat. No. 4,740,299 discloses a fuel filter that has in its housing a collecting chamber for the water separated from the fuel. The fuel is supplied from above into the filter housing; it is assumed that the heavier water proportions in the fuel will sink downwardly and reach the collecting chamber. A portion of the water emulsified in the fuel is however transported with the fuel through the filter material so that at the exit side of the filter there is still water contained in the fuel.

EP 1 256 707 A2 discloses a fuel filter with water-separating means. This fuel filter serving in particular for diesel fuels of an internal combustion engine comprises two filter stages wherein a first filter stage is provided for particulate matter filtration. This filter stage is comprised of a hydrophilic filter material that has the property to coalesce finely divided water in the fuel to larger water particle elements. In the first filter stage a second filter stage of hydrophobic material is arranged downstream wherein this second filter stage is located coaxially within the first filter stage. This arrangement is selected because the fuel exiting from the first filter stage and containing water proportions is impinging without deflection onto the material of the last filter stage. For this type of configuration of a fuel filter, large surface areas of a hydrophilic material of the first stage as well as of the hydrophobic material of the second stage are required.

The present invention has the object to provide a water separator of the aforementioned kind that is of a simple configuration and that achieves an efficient water separation.

SUMMARY OF THE INVENTION

By the configuration of the housing as a tubular body with a horizontal longitudinal axis and a separating wall extending in the direction of the longitudinal axis, in a simple way a separating chamber and a collecting chamber positioned underneath are formed, wherein in the separating chamber the tubular element is arranged that extends parallel to the separating wall. According to an expedient further embodiment, the housing has a separating plane extending transversely to the longitudinal direction; here, the housing parts are joined in a seal-tight way, wherein the separating plane preferably is arranged adjacent to the inlet. In this way, the housing is comprised of only two parts that are producible in a simple way by an injection-molding process. In this connection, the housing parts can be produced of metal or preferably of plastic material. The position of the separating plane near the inlet has the advantage that one of the housing parts receives the separating element at least approximately completely while the other housing part only represents a cover that, optionally, can also have positioning means for positional fixation of the separating element.

Expediently, the separating wall extends from a rearward end of the housing in the direction toward a forward end of the housing, wherein near the forward end a through opening between separating chamber and collecting chamber is formed. In this way, no dead spaces for turbulences are created in the area that conveys the fuel, and admixing of fuel and already separated water that is located in the collecting chamber is avoided. Advantageously, the separating wall extends up to the separating plane. In this way, a sufficient length extension of the separating wall is provided, extending also across the length of the separating element, and the through opening is located in an area that is not flowed through by the fuel but has calm flow.

According to a further embodiment of the invention, the inlet and the outlet are arranged in identical direction at opposite ends of the tubular body and coaxial to the tubular element. In this way, only a minimal flow deflection is required across the entire path from the inlet to the outlet. The tubular element, in this connection, can extend from the inlet to the outlet and can be inserted as a component into the housing upon assembly of the water separator.

The separating element comprises expediently two separating stages wherein the first separating stage has a coalescing effect and the second separating stage is hydrophobic. In the first coalescing-acting separating stage water droplets are formed that, as a result of gravity, will sink in downward direction toward the separating wall and move along the separating wall in the direction toward the opening for passing into the collecting chamber. The second separating stage of a hydrophobic material retains water proportions still contained in the fuel but also entrained water droplets so that at the second separating stage only fuel can pass through. The second separating stage is comprised of a separating nonwoven that is arranged downstream of the first separating stage and in front of the outlet; it has a mesh width between 5 µm and 500 µm.

A simple configuration of the tubular element is achieved in that it comprises a support body that is surrounded at its wall surface by a separating medium that covers the openings in the tubular element. In this connection, preferably the openings in the support body of the tubular element are formed as longitudinal slots. For attachment of the support body in the housing and for simultaneous sealing, it is proposed that the support body with an inlet-side end is received in a socket formed in the housing and preferably extending coaxially to the inlet. In order to guide the fuel through the first separating stage, in the support body, in the area of the outlet-side end of the separating medium of the first separating stage, a radial separating wall is arranged. In this way, a flow of the fuel is forced through the first separating stage.

Moreover, it is advantageous that the tubular element has a tubular section that adjoins on the other side of the separating wall the support body and is provided with radial cutouts. Because of these radial cutouts the fuel can pass into the tubular section wherein the tubular section in the area of the cutouts is surrounded by a separating nonwoven that constitutes the second separating stage. In order to achieve at this end a particularly expedient fixation of the tubular element, it is advantageous that an end of the tubular section neighboring the outlet is received in a socket formed in the housing and extending preferably coaxially to the outlet.

It is also advantageous that the material of the first separating stage is a close-mesh screen, a perforated sheet metal, or a fabric. This material of the first separating stage can be surrounded in a simple way by two joinable liquid-permeable semi-shells by means of which it is connected to the support body. The semi-shells have together approximately the shape of a cylinder and determine thus the outer diameter of the tubular element so that the cross-sectional space requirement in the housing is only minimal. The semi-shells are advantageously connected to each other by means of locking or clip connections wherein the support element is clamped between the edges of the semi-shells. In this way, a fixation of the first separating stage on the support element is provided.

In order to keep the number of required individual parts as minimal as possible and in order to simplify assembly, it is advantageous that the support element with the separating wall and the tubular section is embodied as a monolithic plastic part. In this way, working processes with regard to manufacture and assembly are saved. In order to provide loading of the first separating stage as uniform as possible about its entire length, it is expedient to arrange in the support body an element for flow guiding by means of which the flow cross-section within the support body in the flow direction is reduced.

BRIEF DESCRIPTION OF THE DRAWINGS

Embodiments of the invention will be explained in the following in more detail with the aid of the drawing. The drawing shows in.

EMBODIMENT(S) OF THE INVENTION

Figure 1:
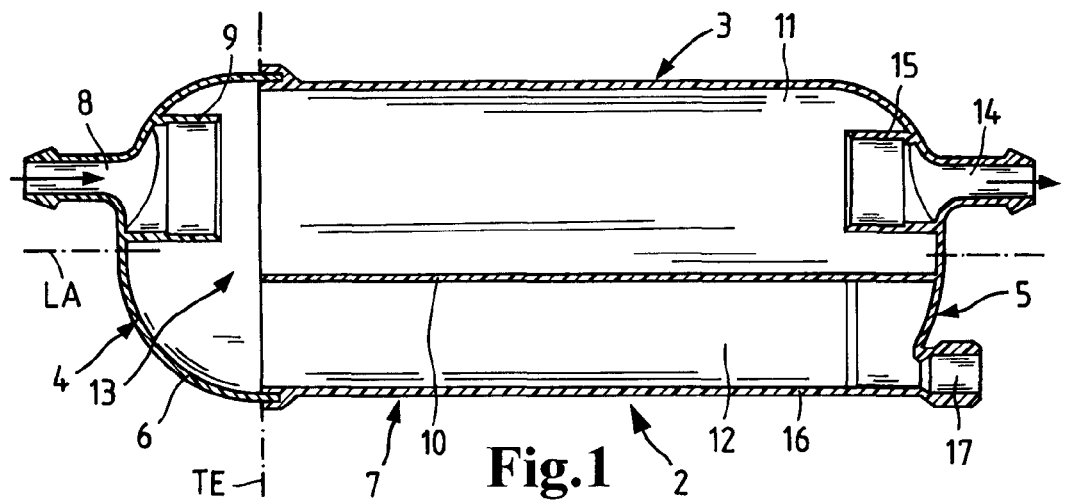
FIG. 1 a longitudinal section through a housing in the form of a tubular body with separating chamber and collecting chamber.

In FIG. 1 a housing 2 is illustrated that is substantially designed as a tubular body 3 that has a longitudinal direction LA and at ends 4, 5 is shaped in an approximately spherical section shape, respectively. The housing 2 has transversely to the longitudinal direction LA a separating plane TE so that two housing parts 6, 7 by being joined at the separating plane TE form the tubular body 3. The separating plane TE is positioned adjacent to an inlet 8 so that the housing part 6 comprises approximately only the spherical section of the end 4 while the housing part 7 forms the main component of the tubular body 3. On the inner side of the housing part 6 a socket 9 is arranged that extends substantially coaxially to the inlet 8 and is formed as a monolithic part together with the housing part 6.

At the other end 5 of the housing 2 a separating wall 10 is arranged that extends in the longitudinal direction LA and somewhat below the center up to the separating plane TE. The separating wall 10 divides in this way the interior of the housing 2 into a separating chamber 11 and a collecting chamber 12 wherein only in the area of the housing part 6 an opening 13 as a connection between separating chamber 11 and collecting chamber 12 is provided. At the end 5 there is an outlet 14 for the fuel that extends in the same direction as the inlet 8 at the other end 4. On the inner side of the housing part 7, a socket 15 is arranged that extends at least approximately coaxially to the outlet 14. At the housing part 7 at the end 5 below the outlet 14, a water discharge socket 17 is arranged immediately above a bottom 16 of the collecting chamber 12. The housing part 7 is preferably monolithically embodied as an injection-molded part together with the separating wall 10, the outlet 14, the socket, and the water discharge socket 17. The housing parts 6, 7 are comprised preferably of plastic material and are fused in the area of the separating plane so that a seal-tight connection is achieved that is resistant to the fuel.

Figure 2:
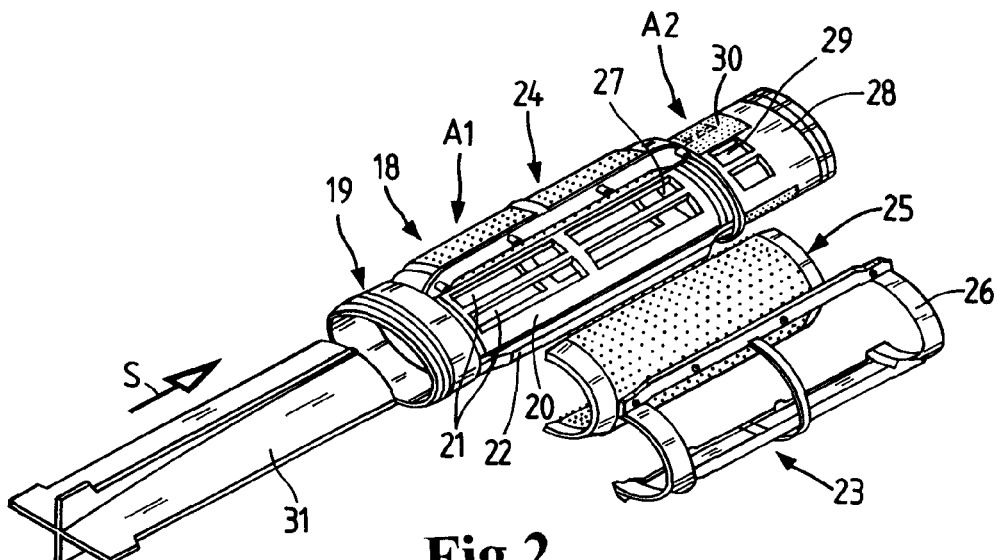
FIG. 2 an illustration of several components of a separating element, partially in an exploded view.

FIG. 2 shows a separating element 18 that is comprised of several components wherein for a better understanding the components are partially shown in exploded view. The separating element 18 is designed as a tubular element 19 with respect to a horizontal arrangement in the separating chamber 11 in the housing 2, as illustrated in FIG. 1. The tubular element 19 comprises a support body 20 on which radial openings 21 in the form of longitudinal slots are formed. The separating body 20 is surrounded across the length of the longitudinal slots by a separating medium 22 so that a first separating stage A1 is formed. The separating medium 22, that is for example a close-mesh screen, a perforated sheet metal, or a multi-layer fabric, is attached by means of semi-shells 23, 24 of a cylindrical shape on the support body 20.

The semi-shells 23, 24 are comprised of a thin-walled perforated material that is shaped to a semi-cylinder 25 and of a frame 26 that extends about the edges of the semi-cylinder 25. On the two frames 26 clips or locking elements may be provided in order to connect the two semi-shells 23, 24 to each other and in this way provide an attachment on the support body 20. The manufacture of the semi-shells 23, 24 of two separate parts, respectively, i.e., the semi-cylinder 25 and the frame 26, provides the possibility of material combination of plastic material and metal, but the semi-shells can also be produced of the same material.

In the support body 20 a separating wall 27 is arranged that extends transversely to the longitudinal direction of the support body and is arranged at a minimal spacing to the rearward end of the openings 21, viewed in the flow direction S of the fuel. In the interior of the support body 20 an element 31 for flow guiding is inserted that is inserted so far into the support body 20 until it is resting against the separating wall 27. The element 31 is designed such that the flow cross-section within the support body 20 in the flow direction S is reduced. In this way, a uniform loading of the first separating stage A1 across its entire length is provided.

Behind the support body 20 at the other side of the separating wall 27 a tubular section 28 adjoins in which radial cutouts 29 are provided. The tubular section 28 is covered by a separating nonwoven 30 that stretches across the cutouts 29. The separating nonwoven 30 is comprised of a hydrophobic material and forms in this way a second separating stage A2. The mesh width of the separating nonwoven 30 can be, for example, between 5 μm and 500 μm.

Figure 3:
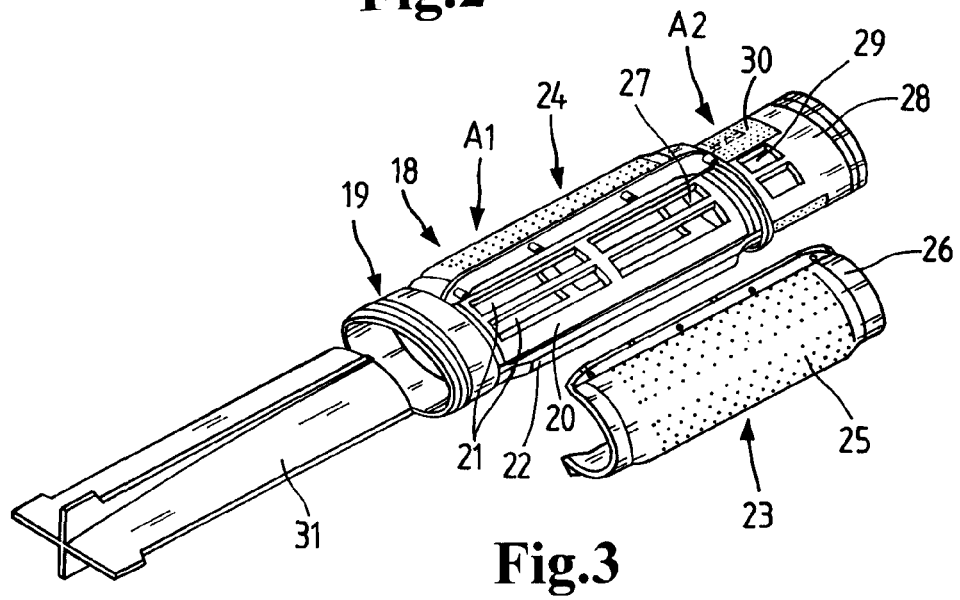
FIG. 3 an embodiment variant of FIG. 2.

In FIG. 3 an embodiment variant of FIG. 2 is shown with a separating element 18 that differs from that of FIG. 2 in that the semi-cylinders 25 and frames 26 of the semi-shell 23, on one hand, and of the semi-shell 24, on the other hand, are formed monolithically and thus also of the same material, either of plastic material or of metal. All other features in FIG. 3 coincide with those of FIG. 2 is so that for the same parts the same reference characters are used.

Figure 4:
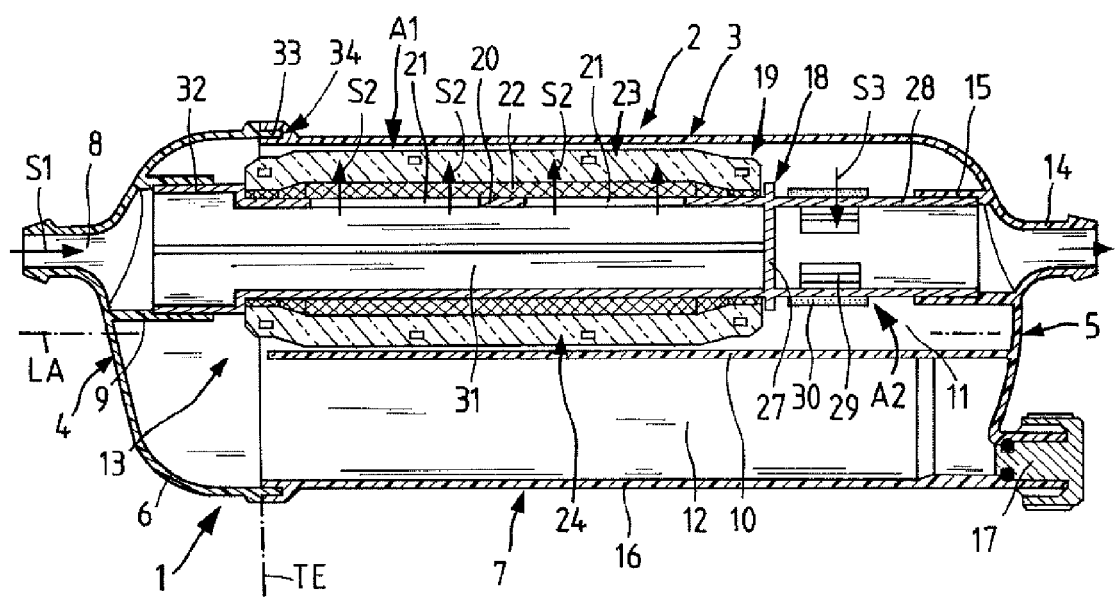
FIG. 4 a longitudinal section through a water separator.

FIG. 4 shows a longitudinal section of a completely mounted water separator 1. The housing 2 is comprised of the housing parts 6, 7, forming the tubular body 3 whose interior is separated by the separating wall 10, extending in the longitudinal direction LA of the housing 2, into the separating chamber 11 and the collecting chamber 12. In the separating chamber 11 there is the separating element 18 in the form of a tubular element 19. The tubular element 19 comprises the support body 20 and the tubular section 28 that are arranged aligned with each other behind each other. On the left end of the support body 20 in FIG. 4, a sleeve 32 is integrally formed that, with regard to its outer circumference, is matched to the inner dimension of the socket 9 at the inlet 8 and is received therein. The right end of the tubular section 28 is matched to the inner dimension of the socket 15 at the outlet 14 and is secured therein.

Mounting of the tubular element 19 in the housing 2 is possible in a simple way in that first the complete separating element 18, with its forward end of the tubular section 28 leading, is introduced into the separating chamber 11 and inserted into the socket 15. If needed, measures for radial sealing between the socket 15 and the tubular section 28 are to be provided. Subsequently, the housing part 6 is advanced in the direction toward the housing part 7 and the socket 9 at the inlet 8 is pushed onto the sleeve 32 wherein also measures for radial sealing may be provided. The housing part 6 is moved so far in the direction toward the housing part 7 until a leading edge 33 of the housing 6 engages a groove 34 of the housing part 7 and is connected seal-tightly therewith. Between the first separating stage A1 and the housing part 7 as well as the separating wall 10 there remains an annular space that ensures satisfactory through-flow. All further reference numerals in FIG. 4 coincide with those of FIGS. 1 to 3 for same parts.

The fuel flows in the water separator 1 through the inlet 8 in the direction of arrow S1 and reaches through the sleeve 32 the interior of the support body 20. Because of the separating wall 27 the fuel according to arrow S2 passes through the openings 21 in the form of longitudinal slots (compare also FIGS. 2 and 3) and farther in radial direction through the separating medium 22 and the semi-shells 23, 24 into the annular space formed between the semi-shells and the inner wall of the housing part 7 as well as the separating wall 10. A uniform loading of the first separating stage A1 is ensured by means of the element 31 for flow guiding that is provided in the interior of the support body 20. When the fuel with water proportions emulsified therein passes through the separating medium 22 that has a coalescing effect, water droplets are formed that, as a result of the horizontal arrangement of the housing 2, will sink to the separating wall 10. The water droplets are guided along the separating wall 10 and reach through opening 13 the collecting chamber 12.

The fuel that has been freed substantially from the water components by the separating stage A1 flows as a result of the suction action at the outlet 14 into the tubular section 28, namely through the separating nonwoven 30 that forms the second separating stage A2 and the radial cutouts 29 according to arrow S3. Since the material of the separating nonwoven 30 has a hydrophobic effect, the water proportions that are still emulsified within the fuel and also already formed water droplets entrained by the flow are retained at the separating nonwoven 30 so that exclusively fuel proportions reach the tubular section 28 and the outlet 14. The water collected in the collecting chamber 12 can be removed by means of generally known devices that are connectable to the water discharge socket 17.

The invention claimed is:

1. A water separator for a fuel supply system of an internal combustion engine, said water separator comprising:
a separator housing including
a tubular body main portion elongated along a longitudinal axis and circumferentially closing over an interior;
a first housing end part secured to and seal-tightly closing over said interior at a forward end of said tubular body;
a second housing end part secured to and seal-tightly closing over said interior at a rearward end of said tubular body;
a fuel inlet formed on the first housing end part;
a fuel out formed on the second housing end part;
a separating wall arranged within said interior of said housing, said separating wall extending in the direction of said longitudinal axis, said separating wall dividing said interior of said housing into a separating chamber and a collecting chamber with said collecting chamber arranged underneath said separating wall and said separating chamber arranged above said separating wall,
wherein said separating wall is joined to and extends from said second housing part in the direction of said longitudinal axis towards said forward end of said tubular body,
wherein near to said forward end a through opening is arranged bypassing said separating wall fluidically connecting said separating chamber and collecting chamber for fluid flow therebetween,
wherein said collecting chamber is positioned and arranged in said housing to collect water separated from said fuel,
an elongated tubular separating element having at least one radial opening extending from an interior chamber of said tubular separating element through a tubular wall of said separating element,
wherein said separating element is arranged within said separator housing and arranged in said separating chamber, said separating element positioned to extend horizontally in said separating chamber and extending substantially parallel to said separating wall,
wherein fuel is guided through said radial openings of said separating element,
wherein an end of said elongated tubular separating element is connected to and support at said fuel outlet on said second housing part.

2. The water separator according to claim 1, wherein
said separator housing has a separating plane positioned at and extending along where said first housing part is secured to said tubular body,
wherein said separating plane extends transversely to said longitudinal axis,
wherein said separating plane is arranged adjacent to said fuel inlet.

3. The water separator according to claim 2, wherein
said separating wall in is joined to and extends from said second housing part in a direction toward said forward end of said tubular body,
wherein near to said forward end a through opening is arranged connecting said separating chamber and collecting chamber for fluid flow therebetween.

4. The water separator according to claim 3, wherein
said separating wall extends up to said separating plane.

5. The water separator according to claim 1, wherein
said fuel inlet and said fuel outlet are arranged in the same direction at opposite ends of said tubular body and coaxially to said tubular element.

6. The water separator according to claim 1, wherein
said separating element comprises
a first separating stage; and
a second separating stage;
wherein said first separating stage has a coalescing effect,
wherein said second separating stage is hydrophobic.

7. The water separator according to claim 6, wherein
said second separating stage is formed by a separating nonwoven that is arranged downstream of said first separating stage,
wherein said second separating stage is arranged at connected to said fuel outlet,
wherein said nonwoven has a mesh width of between 5 m and 500 m.

8. The water separator according to claim 1, wherein said tubular element comprises:
a tubular support body having an outer wall through which said radial openings extend,
a separating medium arranged on a wall surface of said tubular support body and covering over said radial openings in said tubular element.

9. The water separator according to claim 8, wherein said radial openings in said support body of said tubular element are formed as longitudinal slots.

10. The water separator according to claim 8, wherein
said tubular support body includes a fuel inlet end in fluid flow communication with said housing fuel inlet,
wherein said fuel inlet end of said tubular support body is received in a socket that is formed on an interior of housing and extends into said housing interior coaxially to said fuel inlet,
wherein said socket mounts and supports said separating element to said housing.

11. The water separator according to claim 8, wherein
a radial separating wall is arranged within said tubular support body, said radial support wall separating an interior of said tubular support body into an interior of said first separating stage and an interior of said second separating stage;
wherein said radial separating wall is arranged in the area of the outlet-side end of said separating medium of said first separating stage.

12. The water separator according to claim 11, wherein
said second separating stage has a tubular section secured to and extending axially from as tubular support body,
wherein said tubular support body is arranged at a first side of said separating wall and said tubular section is arranged at an opposing second said of said separating wall,
wherein said tubular section is provided with at least one radial cutout, said at least one radial cutout of said tubular section extending through a wall of said tubular section from said second separating stage interior.

13. The water separator according to claim 12, wherein
a separating non-woven is arranged on surrounding said tubular section, said separating nonwoven closing over said at least radial cutout in second tubular section.

14. The water separator according to claim 12, wherein
a fuel outlet end of said tubular section that is neighboring said fuel outlet is in fluid flow communication with said housing fuel outlet,
wherein said fuel outlet end of said tubular section is received into a socket that is formed on an interior of said housing and extends into said housing interior coaxially to said fuel outlet,
wherein said fuel outlet socket mounts and supports said separating element to said housing.

15. The water separator according to claim 6, wherein
coalescing material of said first separating stage is any of: a close-mesh screen, a perforated sheet metal, or a fabric.

16. The water separator according to claim 6, wherein
coalescing material of said first separating stage is surrounded by two joinable liquid-permeable semi-shells,
wherein said semi-shells mount said coalescing material onto said support body.

17. The water separator according to claim 16, wherein
said semi-shells are secured to each other by means of locking or clip connections and said support element is clamped between edges of said semi-shells.

18. The water separator according to claim 12, wherein
said support element including said separating wall and said tubular section is a single unitary, monolithic plastic component.

19. The water separator according to claim 8, wherein said support body further includes
a flow guiding element arranged in said interior of said support body, said flow guiding element dividing said interior of said support body into separated flow regions having a reduced flow cross-section relative to said interior of said support body,
wherein said separated flow regions extend in a flow direction of fuel entering said fuel inlet end of said tubular support body.

20. The water separator according to claim 1, wherein
a water discharge socket is arranged on said housing at a position immediately above a bottom of said collecting chamber at an end of said housing where said fuel outlet is located,
wherein said water discharge socket is operable to discharge water from said collecting chamber to an exterior of said housing.

21. The water separator according to claim 14, wherein
said separator housing has a separating plane positioned at and extending along where said first housing part is secured to said tubular body,
wherein said separating plane extends transversely to said longitudinal axis,
wherein said separating plane is arranged adjacent to said fuel inlet,
wherein said separating wall is joined to and extends from said second housing part in a direction toward said forward end of said tubular body,
wherein said separating wall extends up to said separating plane,
wherein said separating element comprises
a first separating stage; and
a second separating stage;
wherein said first separating stage has a coalescing effect,
wherein said second separating stage is hydrophobic,
wherein said second separating stage is formed by a separating nonwoven that is arranged downstream of said first separating stage,
wherein said second separating stage is arranged at connected to said fuel outlet,
wherein said nonwoven has a mesh width of between 5 m and 500 m,
wherein said tubular support body includes a fuel inlet end in fluid flow communication with said housing fuel inlet,
wherein said fuel inlet end of said tubular support body is received in a socket that is formed on an interior of said housing and extends into said housing interior coaxially to said fuel inlet,
wherein said socket mounts and supports said separating element to said housing, wherein a separating non-woven is arranged on surrounding said tubular section, said separating nonwoven closing over said at least radial cutout in second tubular section, wherein coalescing material of said first separating stage is any of: a close-mesh screen, a perforated sheet metal, or a fabric, wherein said coalescing material of said first separating stage is surrounded by two joinable liquid-permeable semi-shells, wherein said semi-shells mount said coalescing material onto said support body, wherein said semi-shells are secured to each other by means of a locking or clip connections and said support element is clamped between edges of said semi-shells, wherein said support body further includes
- a flow guiding element arranged in said interior of said support body, said flow guiding element dividing said interior of said support body into separated flow regions having a reduced flow cross-section relative to said interior of said support body, wherein said separated flow regions extend in a flow direction of fuel entering said fuel inlet end of said tubular support body, wherein a water discharge socket is arranged on said housing at a position immediately above a bottom of said collecting chamber at an end of said housing where said fuel outlet is located, wherein said water discharge socket is operable to discharge water from said collecting chamber to an exterior of said housing.

* * * * *